(12) United States Patent
Yen et al.

(10) Patent No.: US 10,733,271 B2
(45) Date of Patent: Aug. 4, 2020

(54) SYSTEMS AND METHODS FOR FACILITATING SECURE STREAMING OF ELECTRONIC GAMING CONTENT

(71) Applicant: Acer Cloud Technology, Inc., Sunnyvale, CA (US)

(72) Inventors: Wei Yen, Clyde Hill, WA (US); Pramila Srinivasan, Pleasanton, CA (US); John Princen, Cupertino, CA (US); Raymond W. Lo, Mountain View, CA (US); Wilson Ho, San Mateo, CA (US)

(73) Assignee: ACER CLOUD TECHNOLOGY, INC., Mountain View, CA (US)

( * ) Notice: Subject to any disclaimer, the term of this patent is extended or adjusted under 35 U.S.C. 154(b) by 0 days.

(21) Appl. No.: 15/447,090

(22) Filed: Mar. 1, 2017

(65) Prior Publication Data
US 2017/0177843 A1 Jun. 22, 2017

Related U.S. Application Data

(63) Continuation of application No. 12/281,977, filed as application No. PCT/US2007/010797 on May 2, 2007.
(Continued)

(51) Int. Cl.
*G06F 21/12* (2013.01)
*H04L 9/32* (2006.01)
(Continued)

(52) U.S. Cl.
CPC ............ *G06F 21/128* (2013.01); *A63F 13/35* (2014.09); *A63F 13/71* (2014.09); *A63F 13/79* (2014.09);
(Continued)

(58) Field of Classification Search
CPC ... G06F 21/10; G06F 21/105; H04L 2209/60; H04L 2209/603; H04L 2463/101; H04L 9/3247
(Continued)

(56) References Cited

U.S. PATENT DOCUMENTS

| 5,095,798 A | 3/1992 | Okada et al. |
| 5,184,830 A | 2/1993 | Okada et al. |

(Continued)

FOREIGN PATENT DOCUMENTS

| EP | 0992922 | 4/2000 |
| EP | 1091274 | 4/2001 |

(Continued)

OTHER PUBLICATIONS

International Search Report of PCT Application No. PCT/US2007/010797, dated Aug. 5, 2008.
(Continued)

*Primary Examiner* — Chris Parry
*Assistant Examiner* — Adam A Cooney

(57) ABSTRACT

A game identifier of an encrypted streaming electronic game to be streamed to a playback device may be received. The game identifier may comprise a title of the encrypted streaming electronic game. An electronic ticket for access by the playback device to a secured portion of the encrypted streaming electronic game may be gathered. The electronic ticket may specify a first gameplay state. The electronic ticket may be used to access the secured portion of the encrypted streaming electronic game at the first gameplay state. One or more gameplay actions to transform the encrypted streaming electronic game to a second gameplay state may be received. The second gameplay state may be provided to a state server, where the state server configured to instruct a license server to modify the electronic ticket to
(Continued)

specify the second gameplay state for the encrypted streaming electronic game.

20 Claims, 6 Drawing Sheets

Related U.S. Application Data

(60) Provisional application No. 60/797,263, filed on May 2, 2006.

(51) Int. Cl.
    *H04L 29/06*     (2006.01)
    *G06F 21/10*     (2013.01)
    *A63F 13/35*     (2014.01)
    *A63F 13/71*     (2014.01)
    *A63F 13/79*     (2014.01)

(52) U.S. Cl.
    CPC ............ *G06F 21/10* (2013.01); *H04L 9/3236* (2013.01); *H04L 9/3247* (2013.01); *H04L 63/0428* (2013.01); *H04L 63/104* (2013.01); *H04L 63/123* (2013.01); *G06F 2221/0711* (2013.01); *H04L 2209/56* (2013.01); *H04L 2209/60* (2013.01); *H04L 2463/101* (2013.01)

(58) Field of Classification Search
    USPC ........................................................ 709/217
    See application file for complete search history.

(56) References Cited

U.S. PATENT DOCUMENTS

| | | |
|---|---|---|
| 5,238,250 A | 8/1993 | Leung et al. |
| 5,261,069 A | 11/1993 | Wilkinson et al. |
| 5,367,698 A | 11/1994 | Webber et al. |
| 5,400,402 A | 3/1995 | Garfinkle |
| 5,404,505 A | 4/1995 | Levinson |
| 5,426,763 A | 6/1995 | Okada et al. |
| 5,436,972 A | 7/1995 | Fischer |
| 5,528,513 A | 6/1996 | Vaitzblit et al. |
| 5,553,143 A | 9/1996 | Ross et al. |
| 5,577,209 A | 11/1996 | Boyle et al. |
| 5,586,264 A | 12/1996 | Belknap et al. |
| 5,590,199 A | 12/1996 | Krajewski, Jr. et al. |
| 5,610,839 A | 3/1997 | Karolak et al. |
| 5,638,443 A | 6/1997 | Stefik et al. |
| 5,715,398 A | 2/1998 | Lubenow et al. |
| 5,715,403 A | 2/1998 | Stefik |
| 5,765,152 A | 6/1998 | Erickson |
| 5,781,901 A | 7/1998 | Kuzma |
| 5,786,587 A | 7/1998 | Colgate, Jr. |
| 5,790,170 A | 8/1998 | Suzuki et al. |
| 5,799,086 A | 8/1998 | Sudia |
| 5,805,712 A | 9/1998 | Davis |
| 5,809,242 A | 9/1998 | Shaw et al. |
| 5,815,662 A | 9/1998 | Ong |
| 5,818,512 A | 10/1998 | Fuller |
| 5,829,046 A | 10/1998 | Tzelnic et al. |
| 5,867,223 A | 2/1999 | Schindler et al. |
| 5,892,900 A | 4/1999 | Ginter et al. |
| 5,903,723 A | 5/1999 | Beck et al. |
| 5,905,860 A | 5/1999 | Olsen et al. |
| 5,909,491 A | 6/1999 | Luo |
| 5,913,039 A | 6/1999 | Nakamura et al. |
| 5,933,498 A | 8/1999 | Schneck et al. |
| 5,983,227 A | 11/1999 | Nazem et al. |
| 6,014,558 A | 1/2000 | Thomas |
| 6,016,348 A | 1/2000 | Blatter et al. |
| 6,029,046 A | 2/2000 | Khan et al. |
| 6,032,200 A | 2/2000 | Lin |
| 6,038,601 A | 3/2000 | Lambert et al. |
| 6,044,157 A | 3/2000 | Uesaka et al. |
| 6,049,821 A | 4/2000 | Theriault et al. |
| 6,052,720 A | 4/2000 | Traversat et al. |
| 6,085,193 A | 7/2000 | Malkin et al. |
| 6,141,423 A | 10/2000 | Fischer |
| 6,141,756 A | 10/2000 | Bright et al. |
| 6,148,340 A | 11/2000 | Bittinger et al. |
| 6,157,721 A | 12/2000 | Shear et al. |
| 6,167,441 A | 12/2000 | Himmel |
| 6,185,625 B1 | 2/2001 | Tso et al. |
| 6,195,433 B1 | 2/2001 | Vanstone et al. |
| 6,205,475 B1 | 3/2001 | Pitts |
| 6,212,657 B1 | 4/2001 | Wang et al. |
| 6,216,229 B1 | 4/2001 | Fischer |
| 6,219,680 B1 | 4/2001 | Bernardo et al. |
| 6,219,708 B1 | 4/2001 | Martenson |
| 6,226,618 B1 | 5/2001 | Downs et al. |
| 6,243,719 B1 | 6/2001 | Ikuta et al. |
| 6,256,637 B1 | 7/2001 | Venkatesh et al. |
| 6,259,471 B1 | 7/2001 | Peters et al. |
| 6,260,141 B1 | 7/2001 | Park |
| 6,278,782 B1 | 8/2001 | Ober et al. |
| 6,289,452 B1 | 9/2001 | Arnold et al. |
| 6,289,455 B1 | 9/2001 | Kocher et al. |
| 6,292,899 B1 | 9/2001 | McBride |
| 6,310,956 B1 | 10/2001 | Morito et al. |
| 6,321,209 B1 | 11/2001 | Pasquali |
| 6,330,566 B1 | 12/2001 | Durham |
| 6,338,050 B1 | 1/2002 | Conklin et al. |
| 6,371,854 B1 | 4/2002 | Ikeda et al. |
| 6,377,972 B1 | 4/2002 | Guo et al. |
| 6,389,460 B1 | 5/2002 | Stewart et al. |
| 6,389,538 B1 | 5/2002 | Gruse et al. |
| 6,397,186 B1 | 5/2002 | Bush et al. |
| 6,412,008 B1 | 6/2002 | Fields et al. |
| 6,412,011 B1 | 6/2002 | Agraharam et al. |
| 6,427,238 B1 | 7/2002 | Goodman et al. |
| 6,442,691 B1 | 8/2002 | Blandford |
| 6,446,113 B1 | 9/2002 | Ozzie et al. |
| 6,466,048 B1 | 10/2002 | Goodman |
| 6,480,883 B1 | 11/2002 | Tsutsumitake |
| 6,500,070 B1 | 12/2002 | Tomizawa et al. |
| 6,510,502 B1 | 1/2003 | Shimizu |
| 6,526,581 B1 | 2/2003 | Edson |
| 6,544,126 B2 | 4/2003 | Sawano et al. |
| 6,557,104 B2 | 4/2003 | Vu et al. |
| 6,571,279 B1 | 5/2003 | Herz et al. |
| 6,574,605 B1 | 6/2003 | Sanders et al. |
| 6,587,837 B1 * | 7/2003 | Spagna .................. G06F 21/10 705/26.43 |
| 6,594,682 B2 | 7/2003 | Peterson et al. |
| 6,606,644 B1 | 8/2003 | Ford et al. |
| 6,637,029 B1 | 10/2003 | Maissel et al. |
| 6,654,388 B1 | 11/2003 | Lexenberg et al. |
| 6,669,096 B1 | 12/2003 | Saphar et al. |
| 6,675,350 B1 | 1/2004 | Abrams et al. |
| 6,691,312 B1 | 2/2004 | Sen et al. |
| 6,697,948 B1 | 2/2004 | Rabin et al. |
| 6,704,797 B1 | 3/2004 | Fields et al. |
| 6,751,729 B1 | 6/2004 | Giniger et al. |
| 6,760,324 B1 | 7/2004 | Scott et al. |
| 6,785,712 B1 | 8/2004 | Hogan et al. |
| 6,805,629 B1 | 10/2004 | Weiss |
| 6,807,534 B1 | 10/2004 | Erickson |
| 6,811,486 B1 | 11/2004 | Luciano, Jr. |
| 6,826,593 B1 | 11/2004 | Acharya et al. |
| 6,832,241 B2 | 12/2004 | Tracton et al. |
| 6,857,067 B2 | 2/2005 | Edelman |
| 6,859,535 B1 | 2/2005 | Tatebayashi et al. |
| 6,873,975 B1 | 3/2005 | Hatakeyama et al. |
| 6,901,386 B1 | 5/2005 | Dedrick et al. |
| 6,920,567 B1 | 7/2005 | Doherty et al. |
| 6,928,551 B1 | 8/2005 | Lee et al. |
| 6,938,021 B2 | 8/2005 | Shear et al. |
| 6,948,070 B1 | 9/2005 | Ginter et al. |
| 6,993,137 B2 | 1/2006 | Fransdonk |
| 6,993,557 B1 | 1/2006 | Yen |
| 7,020,480 B2 | 3/2006 | Coskun et al. |
| 7,024,394 B1 | 4/2006 | Ashour et al. |
| 7,035,918 B1 | 4/2006 | Redding et al. |

(56) References Cited

U.S. PATENT DOCUMENTS

| | | | |
|---|---|---|---|
| 7,036,011 B2 | 4/2006 | Grimes et al. | |
| 7,039,708 B1 | 5/2006 | Knobl et al. | |
| 7,051,212 B2 | 5/2006 | Ginter et al. | |
| 7,062,500 B1 | 6/2006 | Hall et al. | |
| 7,069,451 B1 | 6/2006 | Ginter et al. | |
| 7,089,429 B2 | 8/2006 | Gustafsson | |
| 7,092,953 B1 | 8/2006 | Haynes | |
| 7,099,479 B1 | 8/2006 | Ishibashi et al. | |
| 7,120,802 B2 | 10/2006 | Shear et al. | |
| 7,124,304 B2 | 10/2006 | Bel et al. | |
| 7,278,165 B2 | 10/2007 | Molaro | |
| 7,322,042 B2 | 1/2008 | Srinivasan et al. | |
| 7,330,717 B2 | 2/2008 | Gidron et al. | |
| 7,380,275 B2 | 5/2008 | Srinivasan et al. | |
| 7,415,620 B2 | 8/2008 | England et al. | |
| 7,487,363 B2 | 2/2009 | Alve et al. | |
| 7,558,463 B2 | 7/2009 | Jain et al. | |
| 7,636,843 B1 | 12/2009 | Asano et al. | |
| 7,644,429 B2 | 1/2010 | Bayassi et al. | |
| 7,725,399 B2 | 5/2010 | Nakahara et al. | |
| 7,779,482 B1 | 8/2010 | Yen et al. | |
| 7,814,081 B2* | 10/2010 | Futagawa | G06F 9/485 707/703 |
| 7,996,335 B2 | 8/2011 | Shirai et al. | |
| 8,113,955 B1* | 2/2012 | Bae | H04H 20/53 463/40 |
| 8,556,722 B2* | 10/2013 | Novi | A63F 13/12 463/35 |
| 8,578,438 B2 | 11/2013 | Murase et al. | |
| 2001/0014882 A1 | 8/2001 | Stetik et al. | |
| 2001/0026287 A1 | 10/2001 | Watanabe | |
| 2002/0010684 A1* | 1/2002 | Moskowitz | G06F 21/10 705/75 |
| 2002/0016818 A1 | 2/2002 | Kirani et al. | |
| 2002/0026581 A1* | 2/2002 | Matsuyama | G06F 21/10 713/168 |
| 2002/0032784 A1 | 3/2002 | Darago et al. | |
| 2002/0035526 A1* | 3/2002 | Kutaragi | G06F 21/10 705/34 |
| 2002/0049909 A1 | 4/2002 | Jackson et al. | |
| 2002/0057799 A1 | 5/2002 | Kohno | |
| 2002/0059384 A1 | 5/2002 | Kaars | |
| 2002/0071557 A1 | 6/2002 | Nguyen | |
| 2002/0085720 A1 | 7/2002 | Okada et al. | |
| 2002/0116615 A1 | 8/2002 | Nguyen et al. | |
| 2002/0126846 A1* | 9/2002 | Multerer | A63F 13/12 380/251 |
| 2002/0137566 A1 | 9/2002 | Tomizawa et al. | |
| 2002/0138764 A1 | 9/2002 | Jacobs et al. | |
| 2002/0154799 A1 | 10/2002 | Anderson et al. | |
| 2002/0160833 A1 | 10/2002 | Lloyd et al. | |
| 2002/0161673 A1 | 10/2002 | Lee et al. | |
| 2002/0162115 A1 | 10/2002 | Bruckner et al. | |
| 2002/0165022 A1 | 11/2002 | Hiraoka | |
| 2002/0165028 A1 | 11/2002 | Miyamoto et al. | |
| 2002/0169974 A1 | 11/2002 | McKune | |
| 2002/0184160 A1 | 12/2002 | Tadayon et al. | |
| 2003/0009423 A1 | 1/2003 | Wang et al. | |
| 2003/0023427 A1 | 1/2003 | Cassin et al. | |
| 2003/0023564 A1 | 1/2003 | Padhye et al. | |
| 2003/0028622 A1 | 2/2003 | Inoue et al. | |
| 2003/0045355 A1 | 3/2003 | Comair | |
| 2003/0084118 A1 | 5/2003 | Fischer et al. | |
| 2003/0114227 A1 | 6/2003 | Rubin | |
| 2003/0120541 A1 | 6/2003 | Siann et al. | |
| 2003/0144869 A1 | 7/2003 | Fung et al. | |
| 2003/0157985 A1 | 8/2003 | Shteyn | |
| 2003/0166398 A1 | 9/2003 | Netanel | |
| 2003/0182142 A1 | 9/2003 | Valenzuela et al. | |
| 2003/0220142 A1 | 11/2003 | Siegel | |
| 2003/0221189 A1* | 11/2003 | Birum | G06F 8/65 717/170 |
| 2004/0015426 A1 | 1/2004 | Tadayon et al. | |
| 2004/0024688 A1 | 2/2004 | Bi et al. | |
| 2004/0039929 A1 | 2/2004 | Decime | |
| 2004/0044901 A1 | 3/2004 | Serkowski et al. | |
| 2004/0054923 A1 | 3/2004 | Seago et al. | |
| 2004/0083388 A1 | 4/2004 | Nguyen | |
| 2004/0098297 A1 | 5/2004 | Borthwick | |
| 2004/0098580 A1 | 5/2004 | DeTreville | |
| 2004/0098610 A1 | 5/2004 | Hrastar | |
| 2004/0102987 A1 | 5/2004 | Takahashi et al. | |
| 2004/0111756 A1* | 6/2004 | Stuckman | H04N 5/782 725/142 |
| 2004/0116119 A1 | 6/2004 | Lewis et al. | |
| 2004/0158742 A1 | 8/2004 | Srinivasan et al. | |
| 2004/0220926 A1* | 11/2004 | Lamkin | G06F 21/10 |
| 2005/0004875 A1 | 1/2005 | Kontio et al. | |
| 2005/0038753 A1* | 2/2005 | Yen | G06F 21/10 705/59 |
| 2005/0044016 A1* | 2/2005 | Irwin | G06F 21/10 705/30 |
| 2005/0071640 A1 | 3/2005 | Sprunk et al. | |
| 2005/0097618 A1 | 5/2005 | Arling et al. | |
| 2005/0122977 A1 | 6/2005 | Lieberman | |
| 2005/0132217 A1 | 6/2005 | Srinivasan et al. | |
| 2005/0232284 A1 | 10/2005 | Karaoguz et al. | |
| 2005/0273438 A1 | 12/2005 | Yen et al. | |
| 2005/0273439 A1 | 12/2005 | Yen et al. | |
| 2006/0026691 A1 | 2/2006 | Kim et al. | |
| 2006/0031222 A1 | 2/2006 | Hannsmann | |
| 2006/0080529 A1 | 4/2006 | Yoon et al. | |
| 2006/0090084 A1 | 4/2006 | Buer | |
| 2006/0129848 A1 | 6/2006 | Paksoy et al. | |
| 2006/0136570 A1 | 6/2006 | Pandya | |
| 2006/0153368 A1 | 7/2006 | Beeson | |
| 2006/0179126 A1* | 8/2006 | Fujino | H04L 67/06 709/219 |
| 2006/0236122 A1 | 10/2006 | Field et al. | |
| 2007/0005504 A1 | 1/2007 | Chen et al. | |
| 2007/0016832 A1 | 1/2007 | Weiss | |
| 2007/0067826 A1 | 3/2007 | Conti | |
| 2007/0150730 A1 | 6/2007 | Conti | |
| 2007/0207852 A1* | 9/2007 | Nelson | G07F 17/3234 463/24 |
| 2007/0207854 A1* | 9/2007 | Wolf | G06F 12/08 463/29 |
| 2007/0219917 A1* | 9/2007 | Liu | G06F 21/10 705/59 |
| 2007/0255659 A1 | 11/2007 | Yen et al. | |
| 2008/0091945 A1 | 4/2008 | Princen et al. | |
| 2008/0096608 A1 | 4/2008 | Wendling | |
| 2008/0114984 A1 | 5/2008 | Srinivasan et al. | |
| 2008/0275750 A1 | 11/2008 | Robinson et al. | |
| 2009/0150293 A1 | 6/2009 | Yen et al. | |
| 2010/0017627 A1 | 1/2010 | Princen et al. | |
| 2010/0031035 A1 | 2/2010 | Princen et al. | |
| 2010/0091988 A1 | 4/2010 | Srinivasan et al. | |
| 2010/0095125 A1 | 4/2010 | Srinivasan et al. | |
| 2010/0095134 A1 | 4/2010 | Srinivasan et al. | |

FOREIGN PATENT DOCUMENTS

| | | |
|---|---|---|
| JP | 2002007357 | 1/2002 |
| JP | 2002024178 | 1/2002 |
| JP | 2003030458 | 1/2003 |
| WO | 2002029642 | 4/2002 |
| WO | 2002030088 | 4/2002 |
| WO | 2004053720 | 6/2004 |

OTHER PUBLICATIONS

Written Opinion of PCT Application No. PCT/US2007/010797, dated Aug. 5, 2008.

International Search Report of PCT Application No. PCT/US2004/03413, dated Jun. 22, 2007.

Written Opinion of PCT Application No. PCT/US2004/03413, dated Jun. 22, 2007.

International Search Report of PCT Application No. PCT/US2004/37050, dated Jun. 14, 2005.

(56) References Cited

OTHER PUBLICATIONS

Written Opinion of PCT Application No. PCT/US2004/37050, dated Jun. 14, 2005.
International Search Report of PCT Application No. PCT/US2004/40486, dated May 8, 2007.
Written Opinion of PCT Application No. PCT/US2004/40486, dated May 8, 2007.
International Search Report of PCT Application No. PCT/US2007/10797, dated Aug. 5, 2008.
Written Opinion of PCT Application No. PCT/US2007/10797, dated Aug. 5, 2008.
International Search Report of PCT Application No. PCT/US2007/10601, dated Apr. 24, 2008.
Written Opinion of PCT Application No. PCT/US2007/10601, dated Apr. 24, 2008.
International Search Report of PCT Application No. PCT/US2007/19862, dated May 28, 2008.
Written Opinion of PCT Application No. PCT/US2007/19862, dated May 28, 2008.
International Search Report of PCT Application No. PCT/US2007/20074, dated Oct. 8, 2008.
Written Opinion of PCT Application No. PCT/US2007/20074, dated Oct. 8, 2008.
U.S. Appl. No. 10/463,224, filed Jun. 16, 2003.
Arbaugh, William A. et al., "A Secure and Reliable Bootstrap Architecture," University of Pennsylvania (1996).
Aziz, Ashar et al., "Privacy and Authentication for Wireless Local Area Networks," Sun Microsystems, Inc. (1993).
Bharadvaj, Harini et al., "An Active Transcoding Proxy to Support Mobile Web Access," 17th IEEE Symposium on Reliable Distributed Systems, pp. 118-123 (1998).
Davida, George I. et al., "Defending Systems Against Viruses Through Cryptographic Authentication," Proceedings of the 1989 IEEE Symposium on Security and Privacy, pp. 312-318 (1989).
Diffie, Whitfield et al., "New Directions in Cryptography," IEEE Transactions on Information Theory (1976).
Diffie, Whitfield, "The First Ten Years of Public-Key Cryptography," Proceedings of the IEEE, vol. 76, No. 5, pp. 560-577 (May 1988).
Dodson, David A., "Gain Some Perspective With Innovation's GBA to TV Converter," Jun. 6, 2002, http://www.viewonline.com/pages/articles/innovationGBATV.htm, accessed Mar. 29, 2008.
Dyer, Joan G. et al., "Building the IBM 4758 Secure Coprocessor," Computer, pp. 2-12 (Oct. 2001).
Frantzen, Mike et al., "StackGhost: Hardware Facilitated Stack Protection," Proceedings of the 10th USENIX Security Symposium (2001).
Fujimura, Ko, et al., "Digital-Ticket-Controlled Digital Ticket Circulation," Proceedings of the 8th USENIX Security Symposium (1999).
Gligor, Virgil P., "20 Years of Operating Systems Security," University of Maryland (1999).
Gutmann, Peter, "The Design of a Cryptographic Security Architecture," Proceedings of the 8th USENIX Security Symposium (1999).
Hori et al., "Annotation-Based Web Content Transcoding," Computer Networks, 33(1-6): 197-211 (2000).
Itoi, Naomaru, "SC-CFS: Smartcard Secured Cryptographic File System," Proceedings of the 10th USENIX Security Symposium (2001).
Jaeger, Trent et al., "Building Systems that Flexibly Control Downloaded Executable Context," Proceedings of the 6th USENIX UNIX Security Symposium (1996).
Karger, Paul A., "New Methods for Immediate Revocation," Proceedings of the 1989 IEEE Symposium on Security and Privacy (1989).
Kent, Stephen Thomas, "Protecting Externally Supplied Software in Small Computers," Massachusetts Institute of Technology (1980).

Kogan, Noam et al., "A Practical Revocation Scheme for Broadcast Encryption Using Smart Cards," Proceedings of the 2003 IEEE Symposium on Security and Privacy (2003).
Lampson, Butler et al., "Authentication in Distributed Systems Theory and Practice," Digital Equipment Corporation (1992).
Lotspiech, Jeffrey et al., "Anonymous Trust: Digital Rights Management Using Broadcast Encryption," Proceedings of the IEEE, vol. 92, No. 6, pp. 898-909 (Jun. 2004).
Lotspiech, Jeffrey et al., "Broadcast Encryption's Bright Future," Computer, pp. 57-63 (Aug. 2002).
Monrose et al., "Toward Speech-Generated Cryptographic Keys on Resource Constrained Devices," Proceedings of the 11th USENIX Security Symposium (2002).
Neboyskey, "A Leap Forward: Why States Should Ratify the Uniform Computer Information Transaction Act," Federal Communications Law Journal, vol. 52, No. 3, pp. 793-820 (May 2000).
Neumann, P.G. et al., "A Provably Secure Operating System," Stanford Research Institute (1975).
Nonnenmacher, Jorg et al., "Asynchronous Multicast Push: AMP," Proceedings of the 13th International Conference on Computer Communication, pp. 419-430 (Nov. 1997).
Palmer, Elaine R., "An Introduction to Citadel—A Secure Crypto Coprocessor for Workstations," IBM Research Division (1992).
Peterson, David S. et al., "A Flexible Containment Mechanism for Executing Untrusted Code," Proceedings of the 11th USENIX Security Symposium (2002).
Rodriguez, Pablo et al. "Improving the WWW: Caching or Multicast?," Computer Networks and ISDN Systems, 30(22-23):2223-2243 (Nov. 25, 1998).
Rubin, Aviel D., "Trusted Distribution of Software Over the Internet," Internet Society 1995 Symposium on Network and Distributed System Security (1995).
Smith, Sean et al., "Validating a High-Performance, Programmable Secure Coprocessor," Secure Systems and Smart Cards, IBM T.J. Watson Research Center, NY (1996).
Smith, Sean W. et al., "Building a High-Performance, Programmable Secure Coprocessor," Secure Systems and Smart Cards, IBM T.J. Watson Research Center, NY (1998).
Smith, Sean W. et al., "Using a High-Performance, Programmable Secure Coprocessor," Proceedings of the Second International Conference on Financial Cryptography (1998).
Smith, Sean W., "Secure Coprocessing Applications and Research Issues," Los Alamos Unclassified Release LA-UR-96-2805 (1996).
Stefik, Mark, "Trusted Systems," Scientific American, pp. 78-81 (Mar. 1997).
Tygar, J.D. et al., "Dyad: A System for Using Physically Secure Coprocessors," School of Computer Science, Carnegie Mellon University (1991).
Tygar, J.D. et al., "Strongbox: A System for Self-Securing Programs," Carnegie Mellon Computer Science: A 25-Year Commemorative, ed. R. Rashid, ACM Press and Addison-Wesley, pp. 163-197 (1991).
Van Doorn, Leendert, "A Secure Java(TM) Virtual Machine," Proceedings of the 9th USENIX Security Symposium (2000).
Wang, Zheng et al. "Prefetching in World Wide Web," Global TeleCommunications Conference, pp. 28-32 (Nov. 1996).
White et al., "ABYSS: An Architecture for Software Protection," IEEE Transactions on Software Engineering, vol. 16, No. 6, pp. 619-629 (1990).
White, Steve R. et al., "Introduction to the Citadel Architecture: Security in Physically Exposed Environments," IBM Research Division (1991).
Wikimedia Foundation, Inc., "Game Boy Advance," <http://en.wikipedia.org/wiki/GameBoyAdvanced> accessed Mar. 30, 2008.
Wikimedia Foundation, Inc., "Game Boy," <http://en.wikipedia.org/wiki/Game_Boy_Advanced> accessed Mar. 30, 2008.
Wikimedia Foundation, Inc., "Nintendo Game Cube," <http://en.wikipedia.org/wiki/Game_Cube> accessed Mar. 28, 2008.
Wobber, Edward et al., "Authentication in the Taso Operating System," Digital Systems Research Center (1993).
Yee, B. et al., "Secure Coprocessors in Electronic Commerce Applications," Proceedings of the First USENIX Workshop on Electronic Commerce (1995).

(56) References Cited

OTHER PUBLICATIONS

Yee, B., "Using Secure Coprocessors," Ph.D. Thesis, School of Computer Science, Carnegie Mellon University, Pittsburgh, PA (1994).
Notice of Allowance dated Aug. 28, 2007 in U.S. Appl. No. 10/360,827, filed Feb. 7, 2003.
Final Office Action dated Mar. 8, 2007 in U.S. Appl. No. 10/360,827, filed Feb. 7, 2001.
Non-Final Office Action dated Sep. 7, 2006 in U.S. Appl. No. 10/360,827, filed Feb. 7, 2001.
Final Office Action dated Apr. 10, 2009 in U.S. Appl. No. 10/463,224, filed Jun. 16, 2003.
Non-Final Office Action dated Oct. 3, 2008 in U.S. Appl. No. 10/463,224, filed Jun. 16, 2003.
Final Office Action dated Apr. 28, 2008 in U.S. Appl. No. 10/463,224, filed Jun. 16, 2003.
Non-Final Office Action dated Apr. 18, 2007 in U.S. Appl. No. 10/463,224, filed Jun. 16, 2003.
Advisory Action dated Jan. 18, 2008 in U.S. Appl. No. 10/703,149, filed Nov. 5, 2003.
Final Office Action dated Sep. 10, 2007 in U.S. Appl. No. 10/703,149, filed Nov. 5, 2003.
Non-Final Office Action dated Mar. 22, 2007 in U.S. Appl. No. 10/703,149, filed Nov. 5, 2003.
Final Office Action dated May 4, 2006 in U.S. Appl. No. 10/703,149, filed Nov. 5, 2003.
Non-Final Office Action dated Nov. 2, 2005 in U.S. Appl. No. 10/703,149, filed Nov. 5, 2003.
Notice of Allowance dated Apr. 6, 2010 in U.S. Appl. No. 10/1727,332, filed Dec. 2, 2003.
Advisory Action dated May 11, 2009 in U.S. Appl. No. 10/727,332, filed Dec. 2, 2003.
Final Office Action dated Feb. 3, 2009 in U.S. Appl. No. 10/727,332, filed Dec. 2, 2003.
Non-Final Office Action dated Jul. 9, 2008 in U.S. Appl. No. 10/727,332, filed Dec. 2, 2003.
Final Office Action dated Nov. 26, 2007 in U.S. Appl. No. 10/727,332, filed Dec. 2, 2001.
Non-Final Office Action dated May 9, 2007 in U.S. Appl. No. 10/727,332, filed Dec. 2, 2003.
Final Office Action dated Nov. 9, 2006 in U.S. Appl. No. 10/727,332, filed Dec. 2, 2003.
Non-Final Office Action dated Mar. 29, 2006 in U.S. Appl. No. 10/727,332, filed Dec. 2, 2003.
Notice of Allowance dated Dec. 20, 2007 in U.S. Appl. No. 11/048,515, filed Jan. 31, 2005.
Non-Final Office Action dated Sep. 7, 2007 in U.S. Appl. No. 11/048,515, filed Jan. 31, 2005.
Final Office Action dated Mar. 8, 2007 in U.S. Appl. No. 11/048,515, filed Jan. 31, 2005.
Non-Final Office Action dated Sep. 7, 2006 in U.S. Appl. No. 11/048,515, filed Jan. 31, 2005.
Notice of Allowance dated Oct. 3, 2008 in U.S. Appl. No. 11/203,357, filed Aug. 12, 2005.
Final Office Action dated Oct. 31, 2007 in U.S. Appl. No. 11/203,357, filed Aug. 12, 2005.
Non-Final Office Action dated May 8, 2007 in U.S. Appl. No. 11/203,357, filed Aug. 12, 2005.
Final Office Action dated Dec. 11, 2006 in U.S. Appl. No. 11/203,357, filed Aug. 12, 2005.
Non-Final Office Action dated Jun. 14, 2006 in U.S. Appl. No. 11/203,357, filed Aug. 12, 2005.
Final Office Action dated Jun. 18, 2007 in U.S. Appl. No. 11/203,358, filed Aug. 12, 2005.
Non-Final Office Action dated Dec. 14, 2006 in U.S. Appl. No. 11/203,358, filed Aug. 12, 2005.
Non-Final Office Action dated May 18, 2006 in U.S. Appl. No. 11/203,358, filed Aug. 12, 2005.
Non-Final Office Action dated Mar. 13, 2009 in U.S. Appl. No. 11/416,361, filed May 1, 2006.
Notice of Allowance dated Jul. 24, 2009 in U.S. Appl. No. 11/586,446, filed Oct. 24, 2006.
Final Office Action dated Jan. 12, 2009 in U.S. Appl. No. 11/586,446, filed Oct. 24, 2006.
Non-Final Office Action dated May 21, 2008 in U.S. Appl. No. 11/586,446, filed Oct. 24, 2006.
Notice of Allowance dated Aug. 13, 2009 in U.S. Appl. No. 11/601,323, filed Nov. 16, 2006.
Final Office Action dated Apr. 30, 2009 in U.S. Appl. No. 11/601,323, filed Nov. 16, 2006.
Non-Final Office Action dated Sep. 12, 2008 in U.S. Appl. No. 11/601,323, filed Nov. 16, 2006.
Non-Final Office Action dated Apr. 1, 2010 in U.S. Appl. No. 12/330,487, filed Dec. 8, 2008.

* cited by examiner

SYSTEMS AND METHODS FOR FACILITATING SECURE STREAMING OF ELECTRONIC GAMING CONTENT

CLAIM OF PRIORITY

The present application is a continuation application of U.S. patent application Ser. No. 12/281,977, filed Jul. 13, 2009, which is a National Phase application of PCT Application No. PCT/US2007/010797, filed May 2, 2007, which in turn claims priority to Provisional Patent Application No. 60/797,263, filed May 2, 2006. The contents of the foregoing applications are hereby incorporated by reference as if set forth fully herein.

TECHNICAL FIELD

The technical field relates to management of secure streaming content, and more particularly, to systems and methods for facilitating secure streaming of electronic gaming content to a playback device.

BACKGROUND

Mobile devices and other devices with a limited storage capacity are unable to store as much data as users of the device may like. Users of such devices may have a license to use more content than will fit on the device. When content is purchased online, this may become even more troublesome since the capacity of the device directly impacts the amount of content that users might be willing to download. In addition, the users may also generate some content that is associated with the user and/or the licensed content, which needs to be stored on a non-volatile device. This user-generated content may include state of progress in the game, point of achievement, assets, private information, etc.

In some applications, a user requests content by specifying a title (or its identity), and a server responds by providing content and a generated user license. In other words, content and user generated data may not be discarded without the risk of losing the state or the ability to execute or use the content in future.

When a user discards content, state associated with the content is also typically discarded. In some cases, when state for content or for lots of different content takes up a relatively large amount of space—even if the state could be saved when content was discarded—it may be desirable to discard the state to make room for new content and any state associated with the new content. When state is discarded, it is lost even if the user retains a license to the content and downloads the content again later. It would be beneficial to have a flexible mechanism for the management of storage and retrieval of the user's assets: his purchased content and state.

In some implementations, a playback device comprises: one or more processors; memory coupled to the one or more processors, the memory configured to store computer-program instructions to perform a computer-implemented method, the computer-implemented method comprising: receiving a game identifier of an encrypted streaming electronic game to be streamed to the playback device, the game identifier comprising a title of the encrypted streaming electronic game; gathering, using the game identifier, an electronic ticket to facilitate access by the playback device to a secured portion of the encrypted streaming electronic game, the electronic ticket specifying a first gameplay state of the encrypted streaming electronic game; using the electronic ticket to access the secured portion of the encrypted streaming electronic game at the first gameplay state; receiving one or more gameplay actions to transform the encrypted streaming electronic game to a second gameplay state; and providing the second gameplay state to a state server, the state server configured to instruct a license server to modify the electronic ticket to specify the second gameplay state for the encrypted streaming electronic game.

The electronic ticket may facilitate access to the secured portion of the encrypted streaming electronic game on a per-user account basis. The electronic ticket may facilitate access to the secured portion of the encrypted streaming electronic game on a per-device basis.

In some implementations, the first gameplay state specifies a first time a user played the encrypted streaming electronic game, and the second gameplay state specifies a second time the user played the encrypted streaming electronic game. The first gameplay state may specify a first score in the encrypted streaming electronic game, and the second gameplay state may specify a second score in the encrypted streaming electronic game. In various implementations, the first gameplay state specifies a first arrangement of in-game elements in the encrypted streaming electronic game, and the second gameplay state specifies a second arrangement of in-game elements in the encrypted streaming electronic game.

The game identifier may be received from a content server, and the electronic ticket is gathered from a license server. In some implementations, the computer-implemented method further comprises using the electronic ticket to access the secured portion of the encrypted streaming electronic game at the second gameplay state. The playback device may but need not comprise a single playback device.

A computer-implemented method executed on a playback device may comprise: receiving a game identifier of an encrypted streaming electronic game to be streamed to the playback device, the game identifier comprising a title of the encrypted streaming electronic game; gathering, using the game identifier, an electronic ticket to facilitate access by the playback device to a secured portion of the encrypted streaming electronic game, the electronic ticket specifying a first gameplay state of the encrypted streaming electronic game; using the electronic ticket to access the secured portion of the encrypted streaming electronic game at the first gameplay state; receiving one or more gameplay actions to transform the encrypted streaming electronic game to a second gameplay state; and providing the second gameplay state to a state server, the state server configured to instruct a license server to modify the electronic ticket to specify the second gameplay state for the encrypted streaming electronic game.

A non-transitory computer-readable medium may store program instructions thereon, the program instructions configured to instruct one or more processors to perform a method, the method comprising: receiving a game identifier of an encrypted streaming electronic game to be streamed to the playback device, the game identifier comprising a title of the encrypted streaming electronic game; gathering, using the game identifier, an electronic ticket to facilitate access by the playback device to a secured portion of the encrypted streaming electronic game, the electronic ticket specifying a first gameplay state of the encrypted streaming electronic game; using the electronic ticket to access the secured portion of the encrypted streaming electronic game at the first gameplay state; receiving one or more gameplay actions to transform the encrypted streaming electronic game to a second gameplay state; and providing the second gameplay state to a state server, the state server configured to instruct a license server to modify the electronic ticket to specify the second gameplay state for the encrypted streaming electronic game.

The foregoing examples of the related art and limitations related therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique involving a virtual vault to provide a mechanism for flexible management of users' assets is described. The technique involves utilizing a data structure, called an e-ticket, to associate a user with his assets: the purchased titles and user generated state files. This makes it possible for the user to discard the content of the title, for example to save space on a local storage device, but retain a license to the title. The title is associated with, for example, a title ID so that, later, the title content can be recovered from a "virtual vault" by using the title ID as an index. Similarly any state files, for example, game save data can be retrieved using the e-ticket.

Particularly, if content is secure, and the e-ticket is a signed data structure, vault services could be provided by a third party. An example of a recovery technique may involve providing a service that will translate a title ID into a location/download protocol (e.g., URL) that can be used to restore the content for the user.

Advantageously, a title may have application save data, or runtime state, that is generated as the user uses the title. A virtual vault service provider can provide services for the state to be uploaded when the title is discarded. By referencing the license to a title, which includes a binding between, the title, the user and/or device and the content, state can be restored when the title content is restored.

BRIEF DESCRIPTION OF THE DRAWINGS

Embodiments of the inventions are illustrated in the Figures. However, the embodiments and Figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1A:
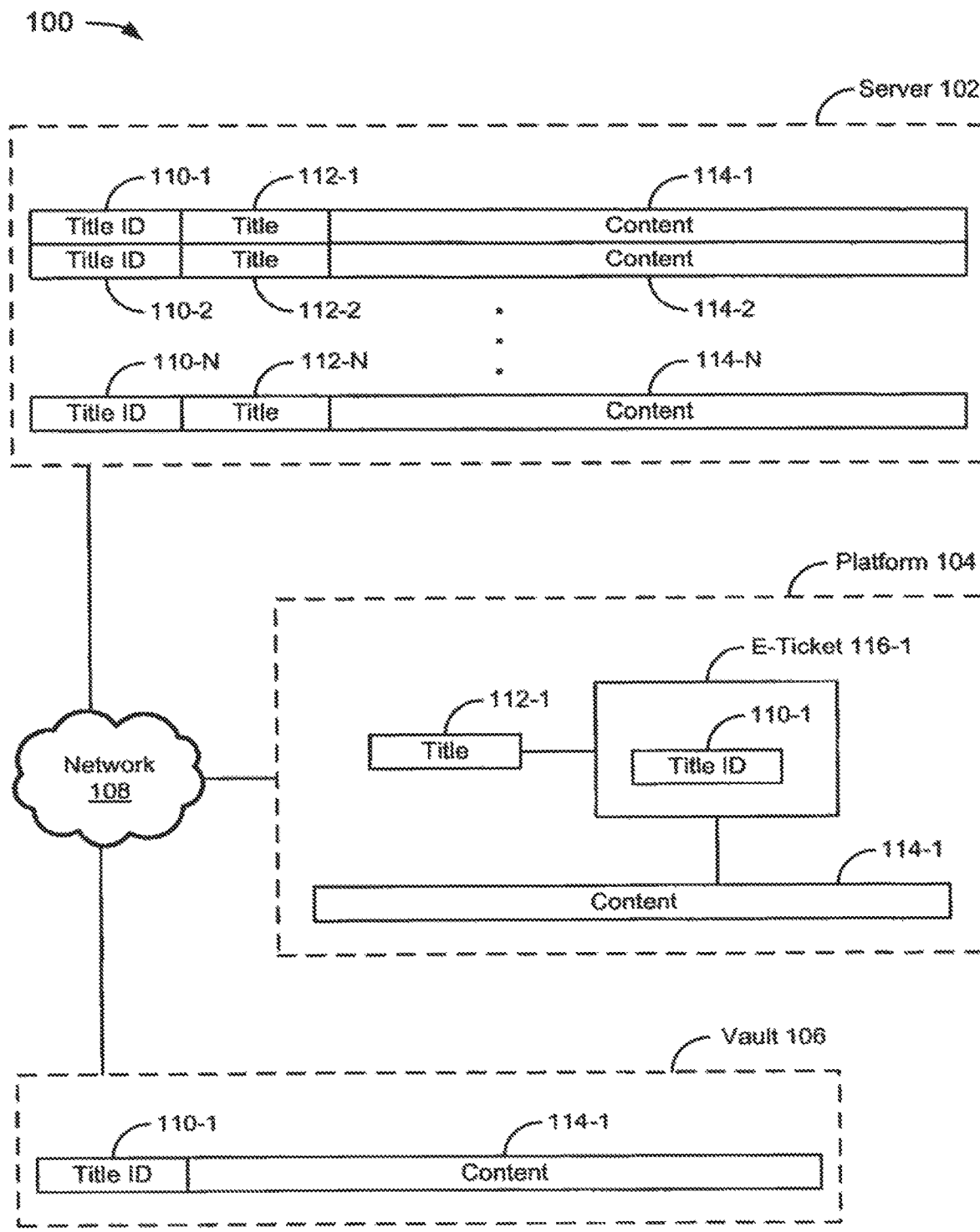
FIGS. 1A and 1B depict an example of a system including a virtual vault.
Figure 1B:
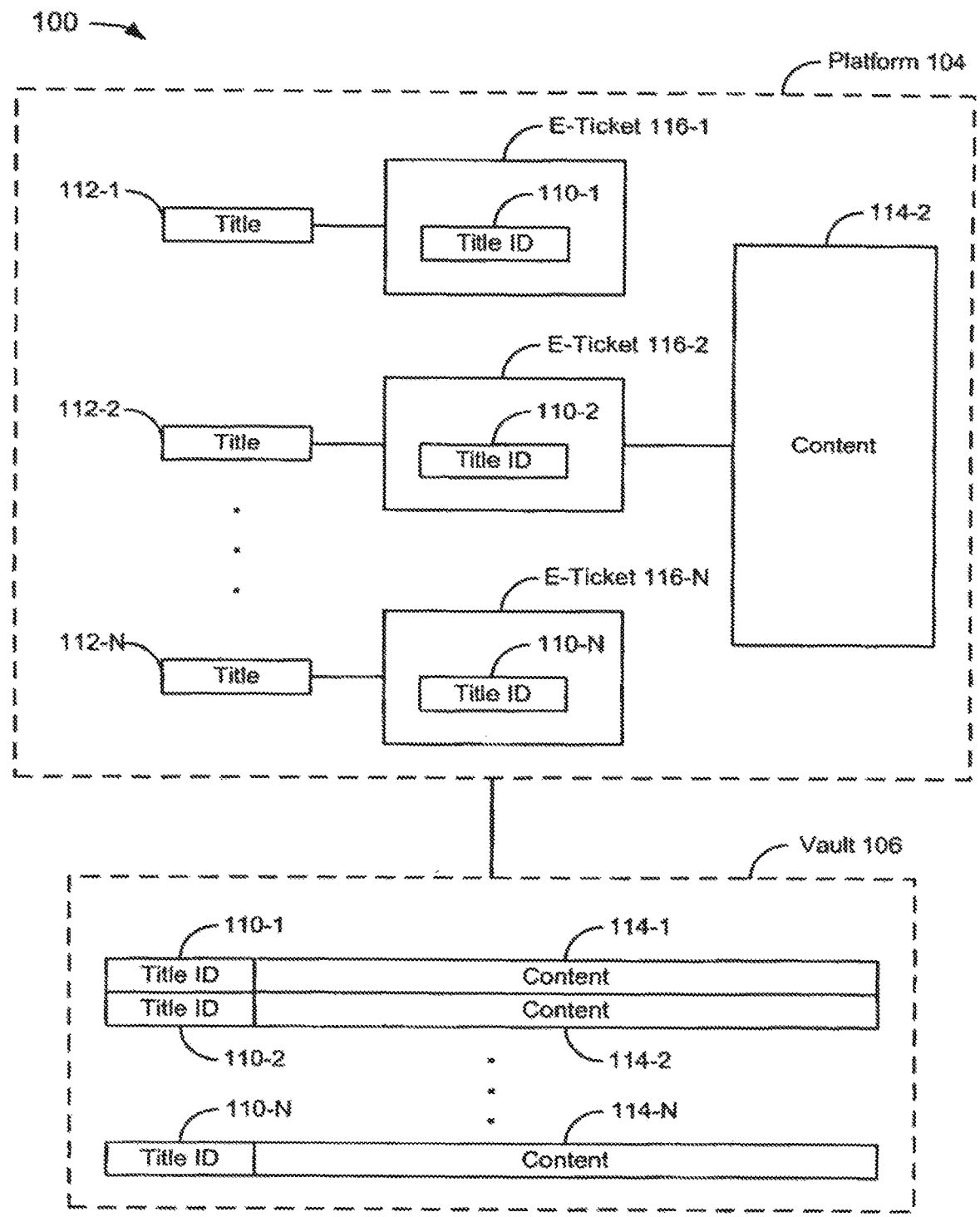

FIGS. 1A and 1B depict an example of a system 100 including a virtual vault. In the example of FIG. 1A, the system 100 includes a server 102, a platform 104, and a vault 106. The server 102, the platform 104, and the vault 106 are coupled to one another via a network 108. FIG. 1A is intended to illustrate an early stage (where the platform 104 has obtained a license for a single title from the server 102), and FIG. 1B is intended to illustrate a later stage (where the platform 104 has multiple licenses for titles and the vault 106 includes content associated with those licenses). Note that the vault may not contain physically separate content storage from the server. It is a virtual representation of the fact that the user of the platform has acquired rights to certain titles and can retrieve them. Since title content is common amongst a large set of users it need only be stored once.

In the example of FIG. 1A, the server 102 includes a plurality of title IDs 110-1 to 110-N (referred to collectively as title IDs 110), a plurality of titles 112-1 to 112-N (referred to collectively as titles 112), and a plurality of content 114-1 to 114-N (referred to collectively as content 114). The content 114 may include any known or convenient electronic content, including but not limited to movies, music, games, programs, objects, data, URLs, etc. A single title ID (e.g., title ID 110-1), title (e.g., title 112-1), and content (e.g., content 114-1) may be referred to as a record that is associated with the title or title ID. The records may be referred to as residing in a database on the server 102. The server 102 may include a variety of components that are not shown, including by not limited to a processor, a communications interface, an input/output controller and/or device, a display device, memory, non-volatile storage, etc.

In the example of FIG. 1A, the platform 104 includes the title 112-1, the content 114-1, and an E-ticket 116-1. The E-ticket 116-1 includes the title ID 110-1 and an identification of the user and/or the user's device. The title 112-1 is illustrated in FIG. 1A as "connected" to the E-ticket 116-1 with a line that is intended to represent an association. Similarly, the content 114-1 is illustrated in FIG. 1A as "connected" to the E-ticket 116-1 with a line that is intended to represent an association. The title ID 110-1, title 112-1, and content 114-1 are assumed to be a record from the database on the server 102. It may be noted that in an alternative embodiment the title or content on the platform could be slightly, significantly, or completely different from the record in the database on the server. However, for illustrative purposes, they are assumed to be the same in the example of FIG. 1A.

The platform 104 could be any of a variety of devices including but not limited to a mobile device, game console, pda, cellular phone, smart phone, computer, appliance, or other electronic device that includes a cache, memory, or storage on which to store content. An E-ticket is, for example, a license to any known or convenient electronic content. An E-ticket may be obtained when a user associated with the platform 104 enters into a transaction with an agent of the server 102 (or an agent affiliated with at least a portion of the database on the server 102).

In an embodiment, the E-ticket is for a title and for the content associated with the title. Advantageously, since the E-ticket is for both the title and for the content, the title and content are separable, though, in an embodiment, they remain linked by a common and at least somewhat unique title ID. Since the E-ticket is for both the title and for the content, the user may be able to discard the content to, for example, save space on a local storage device with limited capacity. The E-ticket may remain on the platform 104 so that the content can be recovered later from the vault 106, using the title ID as an index in a non-limiting embodiment.

A Vault is an entity that is capable of providing storage and retrieval services to a user in the system. The vault may be capable of processing inputs from a user, applying a set of rules, delivering output, and/or receiving input content or data. In the example of FIG. 1A, the vault 106 includes the title ID 110-1 and the content 114-1. In an alternative embodiment, the vault 106 could include the entire record associated with the title ID 110-1. In the example of FIG. 1A, the server 102, platform 104, and vault 106 are remotely located with respect to one another. However, in an alternative embodiment, the vault 106 and the server 102 could be local with respect to one another.

In various embodiments or implementations, the server 102 may provide the content 114-1 to the vault 106 before, during, or after a transaction where the platform 104 obtains the E-ticket 116-1. Alternatively, the platform 104 could provide the content 114-1 to the vault 106 before, during, or after a transaction where the platform obtains the E-ticket 116-1. Alternatively the vault may not store the content, but only a reference to the location of the content in another server. Any convenient provisioning schedule or implementation that would work for the intended purpose is envisioned.

In the example of FIG. 1B, the system 100 includes the platform 104 and the vault 106 (the server 102 and the network 108 are not shown). In the example of FIG. 1B, the vault 106 includes the title IDs 110 and the content 114. it should be noted that a subset of the title IDs 110 and the content 114 could be stored in the vault 106, and some of the title IDs and content could be from sources other than the server 102. So, long as the title ID is sufficiently unique, the records could be from any number of content sources.

In the example of FIG. 1B, the platform 104 includes the titles 112, a plurality of E-tickets 116-1 to 116-N (referred to collectively as E-tickets 116), and, for illustrative purposes, the content 114-2. The E-tickets 116 include respective ones of the title IDs 110.

In operation from FIG. 1A to FIG. 1B, the platform 104 obtains the E-tickets 116 in a known or convenient manner for the content 114. However, the platform 104 discards content associated with the E-tickets 116 for some reason. For example, the platform 104 may discard content because a user explicitly instructs the platform 104 to discard the content, the content may be discarded when the platform 104 is full (e.g., lack of available storage), the content may be discarded if it is unused for some period of time, or the content may be discarded for some other reason.

In an illustrative embodiment, the server might use cryptographically signed state to authenticate state, identify its user, and/or provide requested "storage/retrieval" services for the state.

Regardless of the reason, the platform 104 eventually, for illustrative purposes, only has content for the record associated with the title ID 110-2. The vault 106, on the other hand, retains records for all of the discarded content 114. In the example of FIG. 1B, the vault 106 also includes the record associated with the content 114-2, which has not been discarded. In a non-limiting embodiment, the vault 106 includes records for all content 114 for which the platform 104 (and, depending upon the implementation, other platforms) has a license As an example, assume the platform 104 is going to obtain content 114-1 from the vault 106. If the platform 104 has insufficient storage, the platform 104 may discard the content 114-2. If storage is sufficient, the platform 104 may or may not discard the content 114-2. The platform 104 can provide the E-ticket 116-1 to the vault 106. The vault 106 may include a service that can translate the title ID 110-1 included in the E-ticket 116-1 into, by way of example but not limitation, a location or download protocol (e.g., a URL) that can be used to restore the content 114-1 on the platform 104.

In an embodiment, the vault 106 may be operated by a third party that provides the service. Moreover, if the content 114 is encrypted or otherwise secured, the third party need not even be capable of decrypting or unsecuring the content. In this case, the platform 104 will presumably include some means for decrypting the content 114, such as a key that is associated with one or more of the E-tickets 116.

A given record may have state associated with it, stored at the vault 106. When content associated with a title is discarded, the platform 104 may provide information to the vault 106, updating the state associated with the title. The state can be further updated when the content is later provided to the platform 104. Depending upon the implementation or embodiment, the state may or may not be updated independent of whether content is stored or retrieved.

Figure 2:
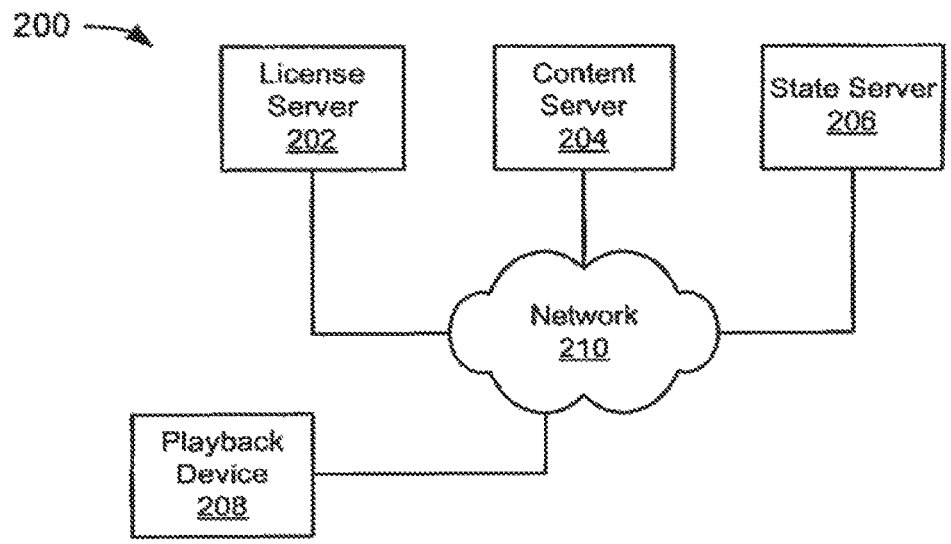
FIG. 2 depicts an exemplary block diagram of a virtual vault system.

FIG. 2 depicts an example of a content management system 200. The system 200 includes a license server 202, a content server 204, a state server 206, a playback device 208, and a network 210. Any of the components may be located remotely with respect to one another, or locally or relatively locally to one or more of the other components.

In the example of FIG. 2, the license server 202 is implemented in a computer-readable medium. The license server 202 may comprise hardware, software, firmware, or some combination thereof. As the name suggests, the license server 202 provides a license to devices, such as the playback device 208. In an illustrative embodiment, the licenses are provided across the network 210 to a requesting device. Alternatively, the license server 202 could also push a license to a non-requesting device. As another alternative, the license server 202 may maintain the license locally, and provide permissions associated with the license instead of sending a copy of the license.

Hereinafter, the term permissions is intended to include a license, a portion of a license, or rules associated with a license that can be used to obtain rights to content associated with the license. When the license server 202 sends permissions, the permissions may be encapsulated in an E-ticket. The E-ticket, in addition to the permissions, may include data such as a title ID to content associated with the permissions.

In a non-limiting embodiment, the E-ticket could manage the usage of content. For example, the E-ticket could include usage rules of the content including, but not limited to, restrictions placed upon the use of the content. Generally, an E-ticket describes information sufficient for the playback device 208 to use the content subject to the rights granted by the E-ticket, and possibly to authenticate the content. Each E-ticket could include a data structure associated with one or more content elements such as a title ID. The E-ticket could also provide for cryptographic techniques that may include (1) an encrypted key for that content, with the effect that the secure processor can access the content if it has access to the license, and (2) a digital signature or secure hash value, with the effect that the license cannot be easily altered and remain effective. The E-ticket could also include a description of those rights license grants to the licensee with regard to the content. The E-ticket could be individually tailored to each individual authorized recipient or user, and to the playback device for which that user is authorized.

The license server 202 may or may not include a relatively local license generator. The license generator could also include usage rules of the user of the playback device and user information such as personal information, UID information, a user subscription, and restrictions placed upon the user. The license generator may also obtain a title ID associated with the content retrieved from the content server 204.

In the example of FIG. 2, the content server 204 is implemented in a computer-readable medium. The content server 204 may comprise hardware, software, firmware, or some combination thereof. As the name suggests, the content server 204 provides content to devices, such as the playback device 208. In an illustrative embodiment, the content is provided across the network 210 to a requesting device. Although the content server 204 could, depending upon the implementation, provide content that does not require a license, for illustrative purposes in this description, content provided by the content server 204 is associated with a license generated by the license server 202.

Generally, content in the content server 204 may store any known or convenient electronic content, including but not limited to movies, music, programs, application software, audio/video presentations, databases, educational programs, games or educational games, media or multimedia content, teaching materials, objects, data, URLs, or reasonable combinations or generations thereof and the like. Content may be stored in files in a directory structure, as blocks for streaming, or in some other known or convenient manner. Content may be to be executed or interpreted (for code or instructions) or to be displayed or presented (for media content). As used herein, the term executed or run is intended to include any use of the content.

In the example of FIG. 2, the state server 206 is implemented in a computer-readable medium. The state server 206 may comprise hardware, software, firmware, or some combination thereof. In an illustrative embodiment, the state server 206 provides storage/retrieval functionality for state, as a service. The state may include application save data.

The state server 206 provides content state information to devices, such as the playback device 208. In an illustrative embodiment, the information is provided across the network 210 to a requesting device. Typically, the state server 206 would first receive content state information from the playback device 208, to be retrieved later. However, the playback device 208 could conceivably request information provided by a different device (not shown), if the playback device 208 has the requisite permissions. Alternatively, the state server 206 could store preconfigured state that the playback device 208 may request.

In the example of FIG. 2, the playback device 208 may include any of a variety of devices including, but not limited to, a mobile device, game console, personal digital assistant ("pda"), cellular phone, smart phone, computer, appliance, portable, or some other device that includes a computer-readable medium. Such devices may include a variety of components (not shown) including, by not limited to, a processor, memory, non-volatile storage, an input/output controller or device, a display, and/or other known or convenient components.

In operation, the playback device 208 obtains an E-ticket from the license server 202 across the network 210. The license server 202 may provide the E-ticket in response to a request from the playback device 208 (i.e., pull) or the license server 202 may push the E-ticket to the playback device 208. In order to push the E-ticket, the playback device 208 must typically be pre-approved, which may be accomplished by some other device (not shown) that obtains the E-ticket for the playback device 208, or the license data could be input directly by a human or artificial agent at the license server 202. For illustrative purposes, in some descriptions provided herein, the E-ticket is obtained before a request for content, though it should be understood that the E-ticket could be provided concurrently with content, or even after content has already been received at the playback device 208.

In operation, the playback device 208 obtains content from the content server 204. The content server 204 may provide the content in response to a request from the playback device 208. The content server 204 may or may not require that the playback device 208 have permission to execute the content prior to providing the content. For example, the playback device 208 may be a secure playback device that can download content, but cannot play the content until the playback device has permission. This may be useful, by way of example but not limitation, when providing demo software to a playback device 208. If the user of the playback device 208 likes the demo, he could obtain permission to "unlock" additional (e.g., paid) features of the software without an additional content download. As another example, a conditional license could grant permissions to additional content when certain conditions are met. Hereinafter, for illustrative simplicity, only content that is downloaded to the playback device 208 to which the playback device 208 has permission is discussed (even though the playback device 208 may not have permission to all of a content download, or permissions may be conditional).

In operation, the playback device 208 executes the content. When content is executed, runtime state may be generated. Runtime state is intended to be more than simply data used in, e.g., a conditional license, such as duration of play or number of times executed. Rather, a first runtime state for content to which the playback device 208 has permission would result in a different experience than a second runtime state for the same content. An example of runtime state is what level of a game has been reached, the possessions of an avatar in a roleplaying game, or the number of gold coins collected in an adventure game.

In operation, the content may be deleted from the playback device 208. Before, concurrently with, or after the content is deleted, the playback device 208 sends state (e.g., game save data) associated with the content to the state server 206. Thus, the content and the content state can be deleted from the device, e.g., to increase the amount of storage on the playback device 208. The E-ticket associated with the content is not deleted from the playback device 208. The E-ticket enables the playback device 208 to recover the deleted content from the content server 204 (or some other content server). Advantageously, the E-ticket also enables the playback device 208 to recover the runtime state from the state server 206.

In an alternative, the playback device 208 could delete even the E-ticket. In such an embodiment, there should be some way for the playback device 208 to recover the license.

This could be accomplished in any known or convenient manner, such as, by way of example but not limitation, requiring a user of the playback device 208 to enter a password to get a new E-ticket from the license server 202 (or some other E-ticket server). After recovering the E-ticket, the playback device 208 could then recover the content and the runtime state associated with the content, as described previously.

Figure 3:
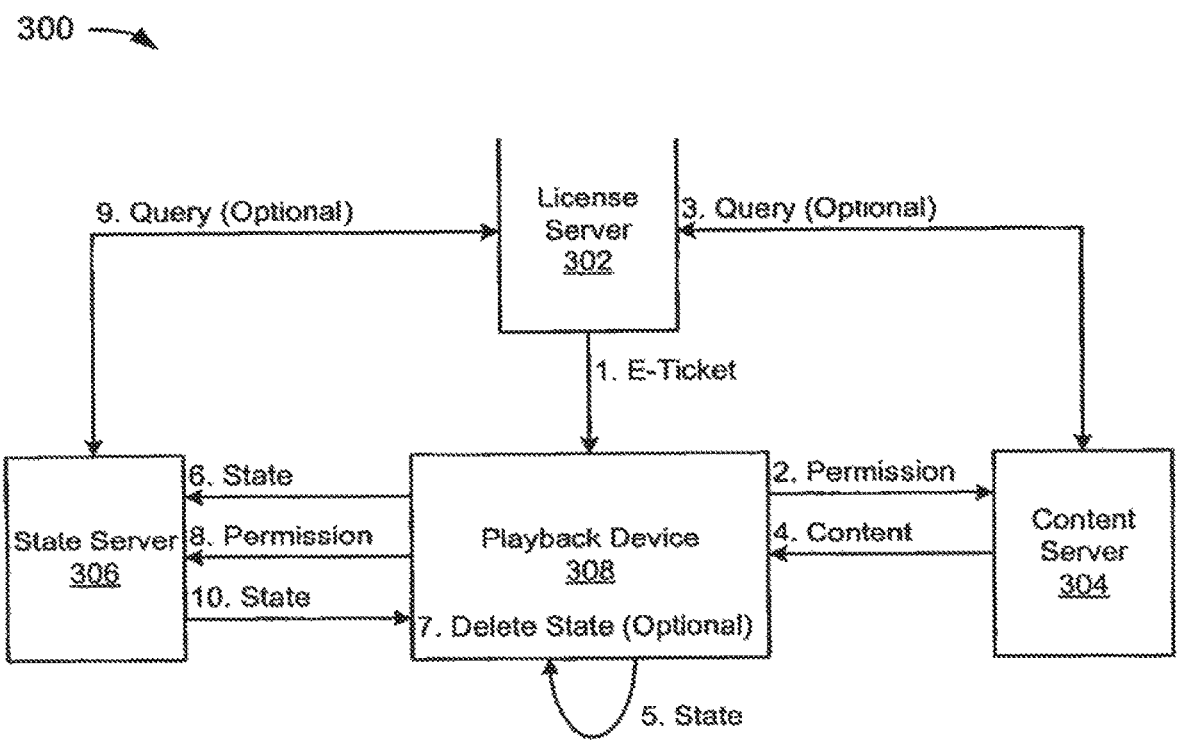
FIG. 3 depicts an example of a flow diagram appropriate for the content management system of FIG. 1.

FIG. 3 depicts an example of a flow diagram 300 appropriate for the content management system 200 (FIG. 2). For illustrative purposes arrows in the example of FIG. 3 depict various transactions between the components over time. The arrows are numbered to illustrate temporal position, though the order of the transactions could be varied, and one or more of the transactions could be implemented outside of the described flow.

In the example of FIG. 3, in a first transaction (transaction 1) the license server 302 provides an E-ticket to the playback device 308. The E-ticket may be provided in response to a request (e.g., in a pull transaction) or it may be pushed. The E-ticket may include permissions to content stored on the content server 304; a unique identifier (UID) associated with the user, playback device 308, or both; a title; a title ID; content size; and/or other implementation- or embodiment-specific data.

In the example of FIG. 3, in transaction 2, the playback device 308 sends a request, including permissions, to the content server 304. The playback device may send additional permissions information with the request, such as a copy of the E-ticket, or a subset of the information from the E-ticket to prove it has the rights to the content.

In the example of FIG. 3, in optional transaction 3, the content server 304 queries the license server 302. If the permissions from the playback device 308 do not include sufficient information to prove the playback device 308 has a license to content, the content server 304 may optionally query the license server 302. The query may use the permissions data to determine whether the playback device 308 actually has permission to receive the content.

In the example of FIG. 3, in transaction 4, the content server 304 provides, in response to the request from the playback device 308, content to the playback device 308. At some point after receiving the content, in transaction 5, the playback device 308 executes the content and generates runtime state.

In the example of FIG. 3, in transaction 6, the playback device 308 provides the runtime state associated with the content to the state server 306. The playback device 308 may also provide sufficient identifying information that the playback device 308 may later request that the state server 306 provide the saved state. The point at which the playback device 308 provides the runtime state may vary depending upon implementation- or embodiment-specific stimuli, or upon user preferences. For example, the playback device 308 may be configured to send runtime state every evening at midnight, or when the content with which the runtime state is associated is deleted. The server may be configured to check a cryptographic signature on the state data to authenticate it. The authenticity is checked by using a device certificate that is made available to the server. The device certificate includes an identity to tie the user making the request to the one who owns the state and the content.

In the example of FIG. 3, in transaction 7, the runtime state is deleted at the playback device 308. It should be noted that the content may be deleted before, concurrently with, or after the content state is deleted; or the content may not be deleted at all. Moreover, it is not necessarily the case that runtime state would be deleted. For example, the playback device 308 could request old runtime state even if the current runtime state is more recent.

In the example of FIG. 3, in transaction 8, the playback device 308 provides permissions to the state server 306. The permissions may or may not be the same as were sent to the content server 304 in transaction 2. It is conceivable that the content server 304 could be implemented with greater security, requiring more secure permissions than that of the state server 306. Nevertheless, the state server 306 may still, in optional transaction 9, query the license server 302 to verify permissions. Finally, in transaction 10, the state server 306 provides the state to the playback device 308.

Figure 4:
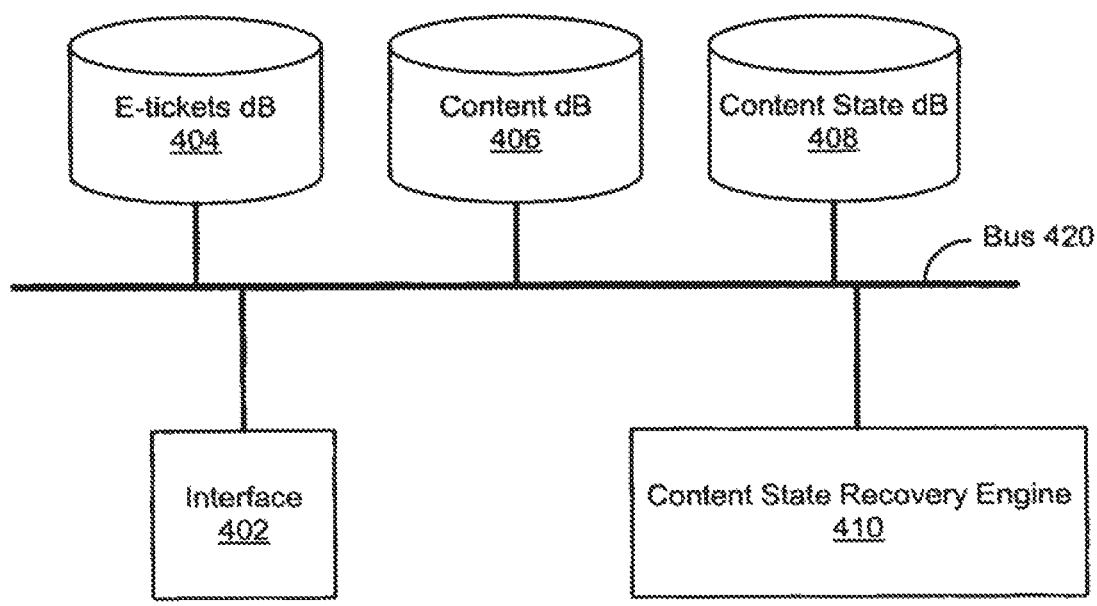
FIG. 4 depicts an example of a playback device including a content state recovery engine.

FIG. 4 depicts an example of a playback device 400 including a content state recovery engine. The playback device 400 includes an interface 402, an E-tickets database (dB) 404, a content dB 406, a content state dB 408, a content state recovery engine 410, and a bus 420 to which each of the components is coupled. It should be noted that a bus architecture is but one known electronic implementation for a computer system, though any known or convenient implementation may be used in lieu of a bus architecture.

The interface 402 may be used to communicate with a communications network or an external device in a manner that is known or convenient. E-tickets, for storage in the E-tickets dB 404 may be received on the interface 402. Similarly, content may be received on the interface 402 for storage on the content dB 406. In an illustrative embodiment, the content state dB includes runtime state associated with content, whether the runtime state is generated locally on the playback device 400 and/or is recovered from an external state database. The content state recovery engine 410 recovers state for the playback device 400. The content state recovery engine 410 may also be responsible for sending state on the interface 402 (for external storage and later recovery).

Figure 5:
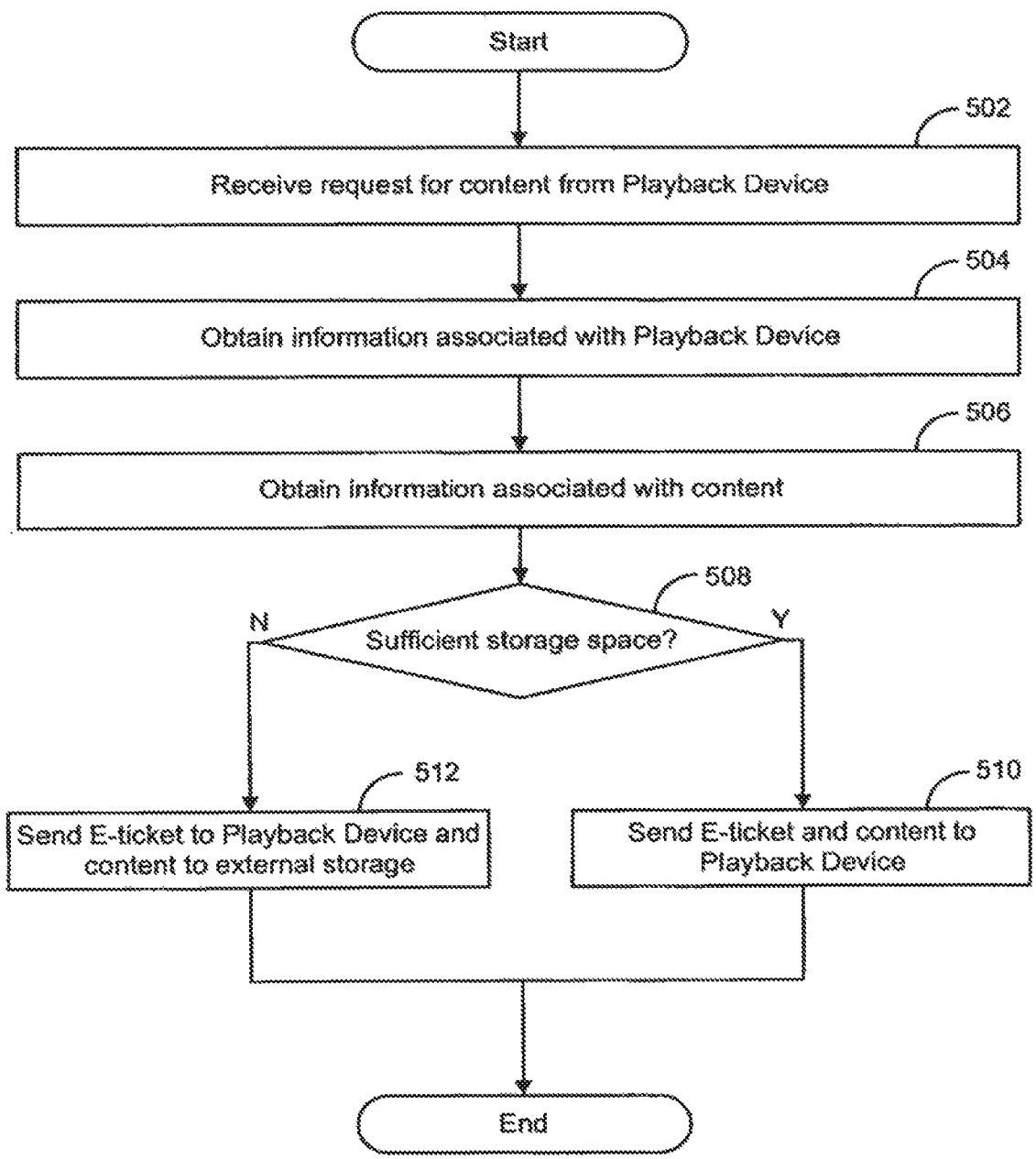
FIG. 5 depicts a flowchart of an example of a method in which a server could distribute content in a network including a playback device having limited storage capacity.

FIG. 5 depicts a flowchart 500 of an example of a method in which a server could distribute content in a network including a playback device of limited storage capacity. The flowchart 500 begins with module 502 where a request is received for content.

In the example of FIG. 5, the flowchart 500 continues to module 504 where information associated with the playback device is obtained. The information may include, for example, the available storage space on the playback device. The flowchart 500 continues to module 506 where information associated with the content is obtained. The information may include, for example, the amount of storage space needed for the content.

In the example of FIG. 5, the flowchart 500 continues to decision point 508 where it is determined whether sufficient storage space is available to store the content on the playback device. If there is sufficient storage (508-Y), then an E-ticket and the content is sent to the playback device 510. If, on the other hand, there is not sufficient storage (508-N), then an E-ticket is sent to the playback device 512, but content is sent to external storage. Then the flowchart 500 ends.

Figure 6:
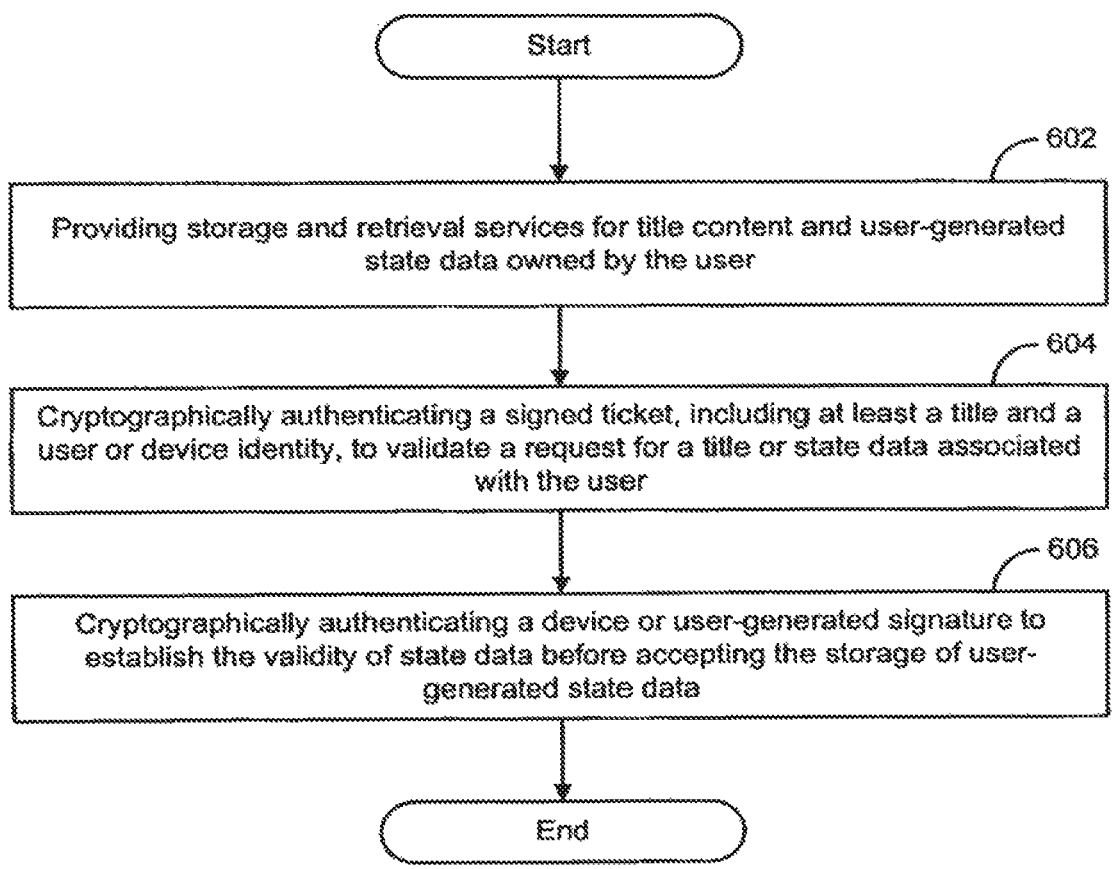
FIG. 6 depicts a flowchart of an example of a method for providing virtual vault services.

FIG. 6 depicts a flowchart 600 of an example of a method for providing virtual vault services. In the example of FIG. 6, the flowchart 600 starts at module 602 with providing storage and retrieval services for title content and user-generated state data owned by the user. User-generated state data may include, by way of example but not limitation, game save data, application save data, runtime state, or other state that is created at a playback device in the course of executing the title content.

In the example of FIG. 6, the flowchart 600 continues to module 604 with cryptographically authenticating a signed ticket, including at least a title and a user or device identity, to validate a request for a title or state data associated with the user. Advantageously, external storage can save content and state data for a given user (or device identity). The user can then recover the content using a relatively small footprint ticket (i.e., a ticket having a significantly smaller footprint than the content and/or the content state).

In the example of FIG. 6, the flowchart 600 continues to module 606 with cryptographically authenticating a device or user-generated signature to establish the validity of state data before accepting the storage of user-generated state data. Advantageously, unauthorized users or devices cannot use up storage resources of the virtual vault, ensuring that only valid users can do so.

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A playback device comprising:
    one or more processors;
    memory coupled to the one or more processors, the memory configured to store computer-program instructions to perform a computer-implemented method, the computer-implemented method comprising:
        receiving a game identifier of an encrypted streaming electronic game to be streamed to the playback device, the game identifier comprising a title of the encrypted streaming electronic game;
        gathering, using the game identifier, an electronic ticket to facilitate access by the playback device to a secured portion of the encrypted streaming electronic game at a first gameplay state of the encrypted streaming electronic game;
        using the electronic ticket to access the secured portion of the encrypted streaming electronic game at the first gameplay state;
        receiving one or more gameplay actions to transform the encrypted streaming electronic game to a second gameplay state;
        deleting the first gameplay state and user-generated content from the playback device, the user-generated content generated by a user of the playback device during gameplay;
        concurrently with the deleting the first gameplay state and the user-generated content from the playback device, providing the first gameplay state and the user-generated content to a state server, the state server configured to store the first gameplay state and the user-generated content to allow retrieval of the first gameplay state and the user-generated content by the user;
        concurrently with the deleting the first gameplay state and the user-generated content from the playback device, providing the second gameplay state to the state server, the state server configured to instruct a license server to modify the electronic ticket to facilitate access by the playback device to the secured portion of the encrypted streaming electronic game at the second gameplay state of the encrypted streaming electronic game.

2. The playback device of claim 1, wherein the electronic ticket facilitates access to the secured portion of the encrypted streaming electronic game on a per-user account basis.

3. The playback device of claim 1, wherein the electronic ticket facilitates access to the secured portion of the encrypted streaming electronic game on a per-device basis.

4. The playback device of claim 1, wherein the first gameplay state specifies a first time the user played the encrypted streaming electronic game, and the second gameplay state specifies a second time the user played the encrypted streaming electronic game.

5. The playback device of claim 1, wherein the first gameplay state specifies a first score in the encrypted streaming electronic game, and the second gameplay state specifies a second score in the encrypted streaming electronic game.

6. The playback device of claim 1, wherein the first gameplay state specifies a first arrangement of in-game elements in the encrypted streaming electronic game, and the second gameplay state specifies a second arrangement of in-game elements in the encrypted streaming electronic game.

7. The playback device of claim 1, wherein the game identifier is received from a content server, and the electronic ticket is gathered from a license server.

8. The playback device of claim 1, wherein the computer-implemented method further comprises using the electronic ticket to access the secured portion of the encrypted streaming electronic game at the second gameplay state.

9. The playback device of claim 1, wherein the playback device comprises a single playback device.

10. The playback device of claim 1, wherein the computer-implemented method further comprises deleting the electronic ticket from the playback device when the first gameplay state and the user generated content are deleted.

11. A computer-implemented method executed on a playback device, the computer-implemented method comprising:
    receiving a game identifier of an encrypted streaming electronic game to be streamed to the playback device, the game identifier comprising a title of the encrypted streaming electronic game;
    gathering, using the game identifier, an electronic ticket to facilitate access by the playback device to a secured portion of the encrypted streaming electronic game at a first gameplay state of the encrypted streaming electronic game;
    using the electronic ticket to access the secured portion of the encrypted streaming electronic game at the first gameplay state;
    receiving one or more gameplay actions to transform the encrypted streaming electronic game to a second gameplay state;
    deleting the first gameplay state and user-generated content from the playback device, the user-generated content generated by a user of the playback device during gameplay;
    concurrently with the deleting the first gameplay state and the user-generated content from the playback device, providing the first gameplay state and the user-generated content to a state server, the state server configured to store the first gameplay state and the user-generated content to allow retrieval of the first gameplay state and the user-generated content by the user;

concurrently with the deleting the first gameplay state and the user-generated content from the playback device, providing the second gameplay state to the state server, the state server configured to instruct a license server to modify the electronic ticket to allow access by the playback device to the secured portion of the encrypted streaming electronic game at the second gameplay state of the encrypted streaming electronic game.

12. The computer-implemented method of claim 11, wherein the electronic ticket facilitates access to the secured portion of the encrypted streaming electronic game on a per-user account basis.

13. The computer-implemented method of claim 11, wherein the electronic ticket facilitates access to the secured portion of the encrypted streaming electronic game on a per-device basis.

14. The computer-implemented method of claim 11, wherein the first gameplay state specifies a first time the user played the encrypted streaming electronic game, and the second gameplay state specifies a second time the user played the encrypted streaming electronic game.

15. The computer-implemented method of claim 11, wherein the first gameplay state specifies a first score in the encrypted streaming electronic game, and the second gameplay state specifies a second score in the encrypted streaming electronic game.

16. The computer-implemented method of claim 11, wherein the first gameplay state specifies a first arrangement of in-game elements in the encrypted streaming electronic game, and the second gameplay state specifies a second arrangement of in-game elements in the encrypted streaming electronic game.

17. The computer-implemented method of claim 11, wherein the game identifier is received from a content server, and the electronic ticket is gathered from a license server.

18. The computer-implemented method of claim 11, further comprising using the electronic ticket to access the secured portion of the encrypted streaming electronic game at the second gameplay state.

19. The computer-implemented method of claim 11, wherein the playback device comprises a single playback device.

20. A non-transitory computer-readable medium storing program instructions thereon, the program instructions configured to instruct one or more processors to perform a method, the method comprising:

receiving a game identifier of an encrypted streaming electronic game to be streamed to the playback device, the game identifier comprising a title of the encrypted streaming electronic game;

gathering, using the game identifier, an electronic ticket to facilitate access by the playback device to a secured portion of the encrypted streaming electronic game at a first gameplay state of the encrypted streaming electronic game;

using the electronic ticket to access the secured portion of the encrypted streaming electronic game at the first gameplay state;

receiving one or more gameplay actions to transform the encrypted streaming electronic game to a second gameplay state;

deleting the first gameplay state and user-generated content from the playback device, the user-generated content generated by a user of the playback device during gameplay;

concurrently with the deleting the first gameplay state and the user-generated content from the playback device, providing the first gameplay state and the user-generated content to a state server, the state server configured to store the first gameplay state and the user-generated content to allow retrieval of the first gameplay state and the user-generated content by the user;

concurrently with the deleting the first gameplay state and the user-generated content from the playback device, providing the second gameplay state to the state server, the state server configured to instruct a license server to modify the electronic ticket to allow access by the playback device to the secured portion of the encrypted streaming electronic game at the second gameplay state of the encrypted streaming electronic game.

\* \* \* \* \*